Dec. 27, 1955   R. O. BRADLEY ET AL   2,728,285
WEIGHT PROPORTION APPARATUS
Filed Sept. 17, 1954   2 Sheets-Sheet 1
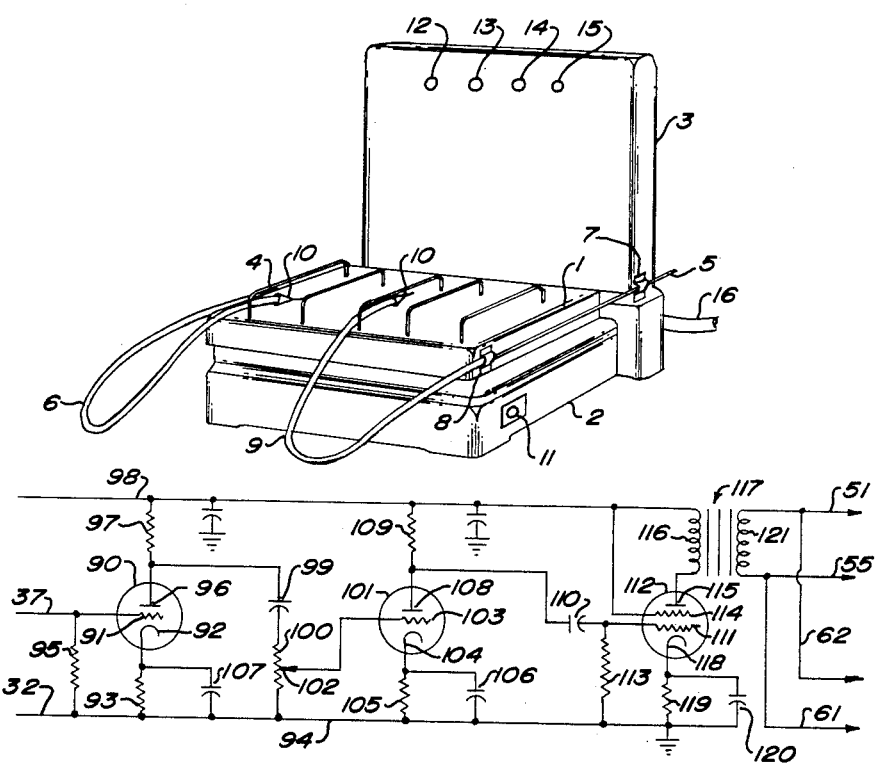
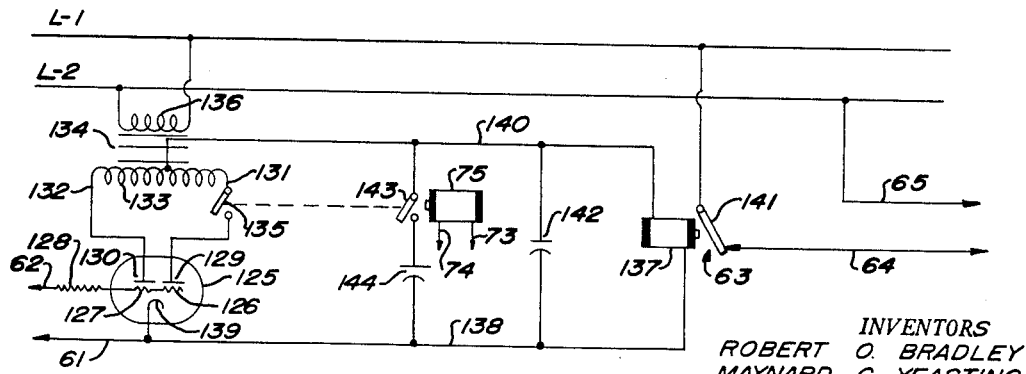
INVENTORS
ROBERT O. BRADLEY
BY MAYNARD C. YEASTING
Marshall, Marshall & Yeasting
ATTORNEYS

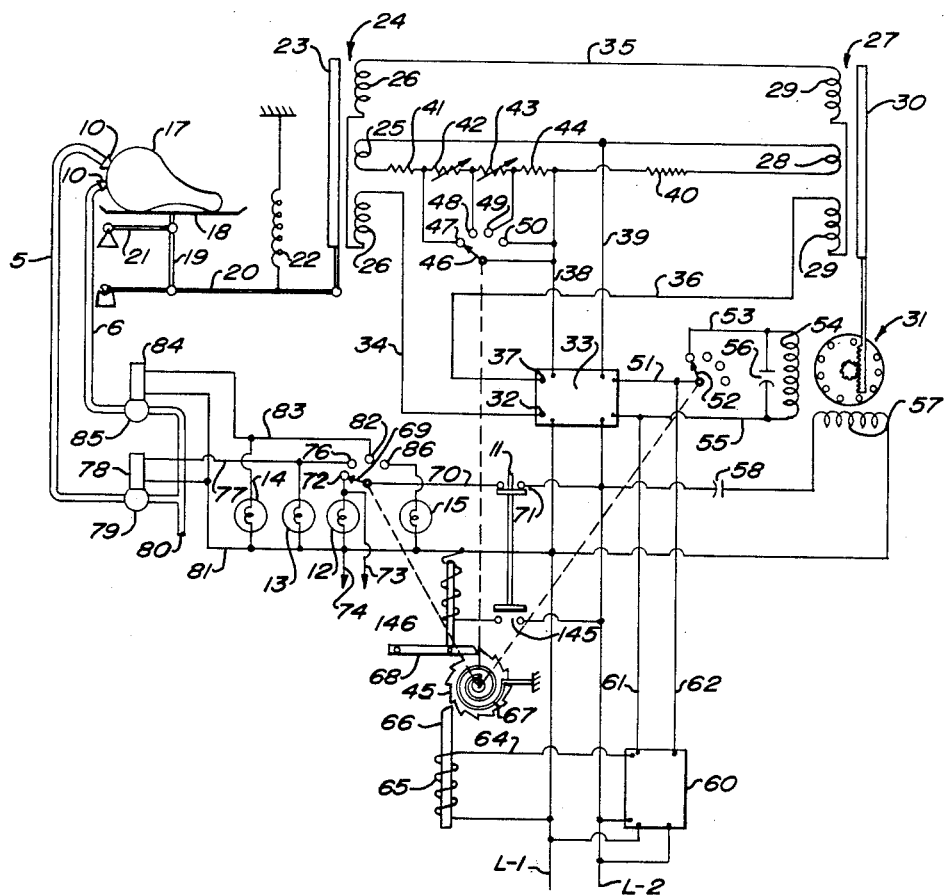

United States Patent Office 2,728,285
Patented Dec. 27, 1955

2,728,285

WEIGHT PROPORTION APPARATUS

Robert O. Bradley, Toledo, and Maynard C. Yeasting, Elmore, Ohio, assignors to Toledo Scale Company, Toledo, Ohio, a corporation of New Jersey Application September 17, 1954, Serial No. 456,758

5 Claims. (Cl. 99—256)

This invention relates to processing equipment and in particular to equipment for automatically adding to a ham a quantity of pickling solution or brine equal to a predetermined percentage of the weight of the ham.

It is quite common in the meat packing industry to process hams by pumping into the veins and arteries a brine pickling solution adapted to preserve as well as flavor the meat. More or less automatic equipment has been devised for this process but the equipment is usually either expensive, cumbersome, or inaccurate.

The principal object of this invention is to provide a highly simplified, easily constructed, accurate processing equipment for metering the brine to be added to a ham.

Another object of the invention is to provide automatic processing equipment in which the control portion of the equipment may be located remotely from the weighing mechanism and thus protected from the brine solutions and other corrosive agents.

A still further object of the invention is to provide a system which may be very easily adjusted to supply different percentages of brine.

A still further object of the invention is to provide a highly simplified method of dividing the pumping of brine between two pumping systems one feeding one side of the ham and another feeding another side of the ham.

Other objects and advantages are apparent from the following description of a preferred embodiment of the invention.

According to the invention a linear data transmitting system is connected between a weighing scale supporting the ham during processing and a control station. A follow-up element of the control equipment is set by a servomechanism to a position corresponding to the weight of the unprocessed ham and the subsequent processing is controlled in one or more steps by comparing the output of the weighing scale transmitter, operating at reduced excitation, with the output of the follow-up element. The excitation of the transmitter is reduced according to the desired percentages of brine addition. The controlled circuits are switched by a multi-section stepping switch having one stepping position for each step of the complete processing cycle. The switch is stepped automatically by the servomechanism equipment at the completion of each step of the cycle.

A preferred embodiment of the invention is illustrated in the accompanying drawings.

In the drawings:

Figure I is a simplified perspective view of a weighing scale suitable for use in the improved processing system.

Figure II is a schematic diagram of the electrical circuits and valving equipment for the processing system.

Figure III is a simplified wiring diagram of an electrical amplifier used in the servomechanism portion of the device.

Figure IV is a schematic wiring diagram of a balance detector amplifier for operating the stepping switch shown in Figure II.

These specific figures and the accompanying description are intended merely to illustrate the invention but not to impose limitations on the claims.

A weighing scale suitable for use has a load receiver 1 supported by a lever system contained in a base 2 and operatively connected to a load counterbalancing mechanism included in a housing 3 erected upon the rear portion of the base 2. The load receiver 1 is further provided with a series of bars forming a grid 4 to support a ham being processed.

Processing brine is fed under pressure from a control valve through flexible hoses 5 or 6 each of which is supported by a clamp 7 attached to the housing 3 and a clamp 8 attached to a depending skirt portion of the load receiver 1. The intermediate portions of the flexible hoses between the clamps 7 and 8 are sufficiently flexible so as not to interfere with the weighing mechanism and are not disturbed by changes in position of looped portions 9 leading to needles 10 that are inserted into blood vessels, either artery or vein, of the ham and clamped therein during processing. A push button 11, conveniently mounted on the base 2 or on some adjacent structure, is employed to start the processing cycle once the ham has been put in place on the grid 4 and the needles 10 inserted. The progress of the processing cycle may be followed by watching a series of signal lights 12, 13, 14 and 15 mounted in the upper portion of the housing 3 or some convenient adjacent location.

An electrical transmitter element connected to the weighing mechanism, the push button 11, and the signal lights 12 to 15 inclusive are connected through a cable 16 to process control equipment located in any adjacent protected space such as a control room adjacent the processing room. If such a control room is not available the control equipment may be located within a sealed compartment mounted in any convenient location.

A ham 17 (Figure II) having the needles 10 inserted and ready for processing is shown supported on a schematically illustrated scale mechanism comprising the receiver 18 mounted on a stem 19 pivotally supported on a lever 20 and check link 21. Load forces applied to the lever 20 are counterbalanced by a load counterbalancing spring 22 that extends to permit the lever 20 to move through equal increments of distance for equal increments of load applied to the receiver 18. Also operatively connected to the lever 20 is a core 23 of a transmitting transformer 24 that includes an exciting coil or primary 25 and a pair of secondary coils 26 connected in voltage opposition and axially aligned with the primary or exciting coil 25. The core 23 is physically located within the aligned coils and is movable axially therethrough according to the movement of the scale lever 20. The net output voltage of the secondary coils 26, which depends directly upon the exciting current in the primary 25, varies substantially linearly with the displacement of the core 23 and in the equipment illustrated is zero when there is no load on the load receiver. A second transformer 27, physically similar to the transformer 24, has a primary or exciting coil 28, electrically opposed secondary coils 29, and a movable core 30 that is positioned axially within the transformer 27 by operation of a motor 31 mechanically connected to the core 30.

The secondary coils 26 of the transformer 24 and coils 29 of the transformer 27 are connected in a series circuit that may be traced from a first input terminal 32 of an amplifier 33 through a lead 34, coils 26 of the transformer 24, a lead 35, coils 29 of the transformer 27, and a lead 36 connected to a second input terminal 37 of the amplifier 33.

The amplifier 33 is energized with alternating current power supplied through leads L1 and L2 and includes suitable transformers to supply power to leads 38 and 39 serving to energize the primary or exciting coils 25 and 28 of the transformers 24 and 27. The primary coil 28, in series with a resistor 40, is connected directly across the leads 38 and 39 and is thus constantly excited. The primary coil 25 of the transmitting transformer 24 is connected in series with a fixed resistor 41, a first adjustable resistor 42, a second adjustable resistor 43, and another fixed resistor 44, the series circuit of resistors and primary coil being connected directly across the leads 38, 39.

A stepping switch having an indexing ratchet wheel 45 includes a first moving switch arm 46 that is directly connected to the lead 38 and is arranged to successively contact, in successive switch positions, a series of contacts 47, 48, 49 and 50 connected respectively to the junctions between the resistors 41—42, 42—43, 43—44, and the lead 38. Successive stepping of the stepping switch thus serves to first energize the exciting coil 25 directly through the first resistor 41 to provide full excitation to the coil 25 and then by successive steps to insert the adjustable resistors 42, 43, and finally, the resistor 44 into the circuit thus reducing the excitation of the primary coil 25 and hence the output voltage of the secondary coils 26 for given positions of the core 23.

The output of the amplifier 33 is, in the first position of the stepping switch, fed through lead 51, a second arm 52 of the stepping switch, a lead 53 connected to a control field 54 of the motor 31, and through a return lead 55 to the amplifier 33. As is common practice, a condenser 56 is connected in parallel with the control field winding 54.

A power field winding 57 of the motor 31, in series with a condenser 58, is connected directly across the supply leads L1 and L2. A balance indicator amplifier 60 is connected through signal input leads 61 and 62 to the output leads 55 and 51 of the amplifier 33. This amplifier is also energized directly from the leads L1 and L2 and includes a relay 63 (Figure IV) adapted to complete a circuit from the lead L2 through a lead 64 and operating solenoid 65 the return side of which is connected directly to the lead L1. This circuit is completed to energize the solenoid 65 whenever the output voltage of the amplifier 33 drops below a certain voltage level or reverses in phase during certain parts of cycle of operation. When the solenoid 65 is energized it raises its armature 66 to advance the ratchet wheel 45 one notch against the resistance of a spiral return spring 67. A latch or pawl 68 prevents return movement of the ratchet wheel 45 when the solenoid 65 is de-energized.

The stepping switch includes a third or output control section having an arm 69 connected through a lead 70 and normally closed contacts 71 of the push button 11 to the lead L2 and arranged in its first position to engage a contact 72 that is connected to the first indicator light 12 and to a lead 73 which together with a return lead 74 serves to energize a coil of a rectifier control relay 75 in the balance indicator amplifier 60 (Figure IV). The indicator light 12 shows that the automatic part of the process cycle has been started and that the control mechanism is adjusting itself to the weight of the ham then on the scale.

After the mechanism has adjusted itself the stepping switch steps once and the arm 69 then engages a second contact 76 to supply power through a lead 77 to an operating coil 78 of a solenoid valve 79 controlling the flow of brine from a supply lead 80 to the first flexible hose 5. This step in the cycle is indicated by illumination of the second signal light 13 connected between the lead 77 and a return lead 81 connecting the coil 78 to the power lead L1.

Upon completion of the second step of the process the stepping switch moves to a third position wherein the arm 69 engages a contact 82 to energize the lead 83 connected to an operating solenoid 84 of a second solenoid valve 85 that controls the flow of brine to the second flexible hose 6. Operation of this part of the cycle is indicated by illumination of a third signal light 14 that is connected between the leads 83 and 81. As the third step in the cycle is completed the stepping switch steps to the fourth position in which the arm 69 engages a contact 86 thereby energizing the fourth indicator light 15 to signal the completion of the process.

The detail operation of the mechanism may be followed by reference to Figures II, III and IV. Figure III is a schematic diagram of the amplifier 33 with the conventional power supply elements omitted and Figure IV is a similar schematic diagram of the balance detector 60. The amplifier 33 is a conventional three stage amplifier having an input stage including a triode amplifier tube 90 having a control grid 91 connected to the input terminal 37 of the amplifier and having a cathode 92 connected through a self-biasing resistor 93 to a grounded lead 94 of the amplifier to which the other input terminal 32 is connected. A grid return resistor 95 may be connected between the input terminal 37 and the grounded lead 94 but this resistor is not essential since the grid 91 is conductively returned to ground by way of the input signal circuit including the secondary coils 26 and 29 of the transformers 24 and 27.

An anode or plate 96 of the amplifier tube 90 is connected through a plate resistor 97 to a positive supply voltage lead 98 and is also connected to a coupling condenser 99 to a gain control potentiometer 100 that serves as a grid resistor for a second amplifier tube 101 of the amplifier 33. A slidable tap 102 of the potentiometer 100 is connected directly to a control grid 103 of the second amplifier tube 101. Its cathode 104 is connected to the grounded return lead 94 through a cathode resistor 105 that is by-passed by a condenser 106. The cathode resistor 93 of the first tube 90 is similarly by-passed by a condenser 107.

A plate 108 of the second amplifier tube 101 is connected through a plate resistor 109 to the positive supply lead 98 and through a coupling condenser 110 to a control grid 111 of a third amplifier tube 112. The control grid 111 is returned to ground through a grid resistor 113. The amplifier tube 112, serving as a power amplifier, includes a screen grid 114 connected directly to the positive lead 98 and a plate 115 connected to the positive lead through a primary 116 of an output transformer 117. A cathode 118 of the power amplifier tube 112 is connected to the grounded lead 94 through a cathode resistor 119 that is by-passed with a condenser 120. A secondary winding 121 of the output transformer 117 is connected directly to leads 51, 55, 61 and 62. The amplifier serves to amplify the unbalance voltage existing between the secondary coils 24 and 27 into a voltage of sufficient magnitude to operate the motor 31 in a direction to move the core 30 of the receiver transformer 27 to a position corresponding to the position of the core 23 of the transmitting transformer 24. The only function of the amplifier is this function of increasing the voltage of the transformers sufficiently to energize the motor 31 or the leads 61, 62 leading to the balance detector amplifier 60.

The balance detector amplifier 60 includes a single dual triode 125 having its cathode connected directly to the lead 61 and having both of its grids 126 and 127 connected through a current limiting resistor 128 to the lead 62. Plates 129 and 130 of the dual triode 125 are connected to terminals 131 and 132 of a center tapped secondary winding 133 of a transformer 134. A contact 135 of the relay 75 is included in series with the lead to the plate 129. The transformer 134 is energized by a primary winding 136 connected directly to the leads L1 and L2.

The dual triode 125, operating as a full-wave or half-wave grid-controlled rectifier according to the condition of the contacts 135, energizes a relay coil 137, one side of which is connected through a lead 138 to the cathode 139 of the dual triode tube 125 and the other side of which is connected through a lead 140 to the center tap of the secondary winding 133 of the transformer 124. To prevent chattering of an armature 141 of the relay coil 137, a condenser 142 is connected in parallel with the coil 137.

The relay coil 75, when energized through leads 73 and 74 during the first part of the process cycle, is arranged to close contacts 143 to add a second condenser 144 into the circuit in parallel with the condenser 142 at the same time that it closes the contacts 135 operate the dual triode 125 as a full wave rectifier.

After the operator has placed a ham on the scale and inserted and clamped the needles 10, he pushes the push button 11 to start the processing cycle. As the button 11 is pushed it opens the contacts 71 and closes a second set of contacts 145 so as to complete a circuit from the lead L2 through latch release coil 146 of the stepping relay, the coil 146 being returned directly to the lead L1. Energizing the coil 146 withdraws the latch 68 and permits the stepping relay to return directly to its first position. The contacts 71 are opened during this time to avoid momentarily energizing solenoid valves as the stepping switch arm 69 sweeps over the contacts 82 and 76. With the stepping switch in its first position the control field 54 of the motor 31 is connected to the amplifier 33, the stepping switch arm 46 engages contacts 47 to provide full excitation for the primary coil 25 of the transmitting transformer 24 and the arm 69 engages contacts 72 to energize the relay 75. The motor 31 thereupon runs in which ever direction is required so as to move the core 30 of the receiving transformer 27 into a position that corresponds to the position of the core 23 of the transmitting transformer 24. The transmitting transformer core is positioned according to the load on the load receiver 18, that is, the weight of the ham 17 prior to processing. When the core 30 has been driven by the motor 31 to a position corresponding to the position of the core 23 the output voltages of the secondary coils 26 and 29 of the transformers balance and the output of the amplifier 33 reduces to zero or a small residual voltage. Until a balance is reached the amplified output voltage of the transformers is fed from the amplifier 33 to the grids 126 and 127 of the balance detector amplifier 60 so that the dual triode 125 passes current, regardless of the phase of the output voltage of the amplifier 33, to energize the relay 137 and thus de-energize the operating coil 65 of the stepping switch. When balance is reached and the output voltage of the amplifier 33 drops to a minimum or zero the dual triode 125 of the balance amplifier 60 no longer passes enough current to energize the relay 137 and it, as soon as the condensers 142 and 144 can discharge through the relay coil, releases its armature 141 thereby energizing the operating coil 65 of the stepping relay to advance the ratchet wheel 45 one step. The delay provided by the discharge of the condensers 142 and 144, in particular the condenser 144, is sufficient to prevent operation of the stepping switch as the output voltage of the amplifier 33 goes through zero as the motor 31 overshoots or hunts before coming to rest.

Upon operation of the stepping switch after the motor has come to rest the motor is disconnected from the amplifier 33 so as to leave the core 30 of the receiving transformer in a position corresponding to the weight of the unprocessed ham regardless of any subsequent changes in weight of the ham during processing. The advance of the stepping switch arm 46 from the contact 47 to the contact 48 inserts the adjustable resistor 42 in series with the primary coil 25 of the transmitting transformer 24 and thus reduces its excitation and therefore its output voltage. The resistance of the adjustable resistor 42 is adjusted according to the percentage amount of brine to be pumped into the first side of the ham and the adjusted resistance value of the resistor 42 has the same ratio to the resistance of the resistor 41 and coil 25 as the selected weight of brine has to the weight of the "green" or unprocessed ham. Thus if it is desired to pump brine equal to five per cent of the weight of the ham into the first side of the ham the resistance of the resistor 42 is adjusted to five per cent of the resistance of the resistor 41 and coil 25. The decrease in excitation of the transformer 24 reduces its output voltage and thereby unbalances the signal into the amplifier 33 thus providing a signal to the balance detector amplifier 60.

This signal into the amplifier 60 re-energizes the relay 137 thereby de-energizing the stepping switch operating solenoid 65. When the arm 69 of the stepping switch moved from its first to its second position it de-energized the relay 75 at the same time that it energized the solenoid valve 79. De-energizing the relay 75 by opening the contact 135 converts the dual triode 125 into a half-wave grid-controlled rectifier and the phasing of the transformer 134 is such that the plate voltage is in phase with the amplifier output voltage so that the tube 125 draws current to energize the relay 137.

As the brine flows through the valve 79 into the ham 17 the weight increases and the core 23 of the transmitting transformer 24 moves relative to its coils thus increasing the output voltage of the secondary coils 26 until they again match the output voltage of the secondary coils 29 of the receiving transformer 27. As the signal voltage drops the half wave rectifier of the balance detector reduces its output current so as to de-energize the relay 137 and cause a second stepping of the stepping switch thus going from the second to the third part of the processing cycle. Since the condenser 144 is not connected at this time the relay action is very prompt so as to quickly cut off the brine immediately upon reaching the correct weight. Should the scale overshoot slightly so that the output voltage of the transmitter transformer 24 exceeds the voltage of the receiving transformer the phase of the output of the amplifier reverses. This does not re-energize the relay 137 because the out-of-phase relation between the reversed signal on the grid 127 with respect to the voltage on the plate 130.

When the balanced condition was reached while feeding the brine through the valve 29 and flexible hose 5 the stepping switch advanced to its third position in which the second solenoid valve was energized and in which the second adjustable resistor 43 was inserted with series with the first adjustable resistor 42 and the fixed resistor 41. This further reduces the excitation of the primary coil 25 and hence reduces the output voltage of the transmitter coils 26 of the transformer 24 so that an unbalance signal is again supplied to the amplifier 33 and from it to the balance detector amplifier 60. This signal, since the output of the coils 26 is less than that of the coils 29 is properly phased to again energize the relay 137. As the brine flows through the valve 85 the weight increases until another given percentage selected by adjustment of the resistor 43 is reached. This condition is indicated by the output voltage of the transformer 24 again matching that of the transformer 27 so as to reduce the signal transmitted through the amplifiers 33 and 60 and again release the relay 137 to cause the stepping switch to step to its fourth position. In the fourth position the solenoid valves are closed and the resistor 44 is inserted in series with the primary coil 25 of the transmitting transformer. This again unbalances the signal to the amplifiers and thus again energizes the relay 137.

This completes the processing cycle and this condition is indicated by illumination of the light 15 thus informing the operator to remove the processed ham and prepare another for the next cycle of operation.

Reduction in the excitation of the transmitting transformer 24, which is essentially a linear device in that its output voltage is proportional to its excitation and its core displacement, requires that the core travel an increased distance to again generate sufficient voltage to match that of the receiving transformer. It may be shown mathematically that, within the linearity of the transformer, the increased core travel to produce a given output voltage is directly proportional to the resistance added in the primary circuit. Thus the proper weights of brine may be easily obtained in proportion to the weight of the ham by first setting the output voltage of the receiving transformer to a voltage corresponding to the voltage of the unprocessed ham and then adding brine until the transmitting transformer, operated at reduced excitation, generates a voltage corresponding to the weight of the unprocessed ham. By increasing the resistance of the excitation circuit a linear relation is obtained between the percentage increase in resistance and the percentage increase in weight required to maintain an electrical balance in the circuit. This simplifies the construction and calibration of the equipment and provides ease of operation.

Should it be desired to pump all of the brine into the ham through one needle, known as "single pumping," one solenoid valve is connected to contacts 76 and 82 and the total percentage is divided between the adjustable resistors 42 and 43. As far as the operator is concerned the equipment then apparently operates in three steps, i. e., weigh, pump, and wait since there is no visible change in indication apparent when the stepping switch operates during the pumping cycle to insert the resistor 42 into the circuit.

Various modifications may be made in specific details of construction and operation without departing from the scope of the invention.

Having described the invention, we claim:

1. In a processing system in which material in proportion to the base weight of an article is to be added to the article, in combination, a load receiver for the article, automatic load counterbalancing means for offsetting the load on the load receiver, a separately excited signal generator operatively connected to the load offsetting means and adapted to generate a signal proportional to load, a second signal generator, servo means for conditioning the second generator to equalize the outputs of the generators with an unprocessed article on the load receiver, means for locking the servo means on equalization of the generator outputs, processing means, means initiated by locking of the servo for operating the processing means and reducing the excitation of the first signal generator, and means responsive to equalization of the generator outputs at reduced excitation for terminating the operation of the processing means.

2. In a processing system in which material in proportion to the base weight of an article is to be added to the article, in combination, a load receiver for the article, automatic load counterbalancing means for offsetting the load on the load receiver, a separately excited electromagnetic signal generator operatively connected to the load counterbalancing means for generating a signal proportional to load, a second signal generator, servo means operatively connected to said second generator and adapted to equalize the outputs of the generators, means for de-energizing the servo means when the generator outputs are equalized, said means also serving to start the processing means and reduce the excitation of the first generator, and means responsive to equalization of the generator outputs during processing for terminating the processing.

3. In a processing system in which a quantity of material equal to a predetermined proportion of the weight of an object is to be added to the object; in combination; a load receiver; automatic load counterbalancing means operatively connected to the load receiver; a separately excited signal generator operatively connected to the counterbalancing means and adapted to generate a signal proportional to load; a second signal generator; servo means for causing the second generator to follow the first; processing means; a multiple step switching means connected to the servo means, the generators and the processing means; said switch means having a first position in which the servo means are energized; a second position in which the servo means are de-energized, the excitation of the first generator decreased, and the processing means energized; and another position in which the servo means and processing means are de-energized; and means for stepping the switching means upon equalization of the outputs of the signal generators.

4. In a processing system in which material equal in weight to a predetermined percentage of the weight of an object is to be added to the object, in combination, a load receiver, an automatic load counterbalancing mechanism operatively connected to the load receiver, a transmitting signal generator operatively connected to the counterbalancing mechanism and adapted to generate a signal generally proportional to load, a second signal generator, followup means for maintaining the second signal generator in correspondence with the first signal generator, processing means, means for varying the excitation of the first signal generator, a sequencing relay interconnecting the signal generators, followup means and processing means, said relay having a first position in which the first signal generator has rated excitation and the followup means are energized, a second position in which the first signal generator excitation is reduced and the processing means is energized in lieu of the followup means, and a third position in which at least the processing means is de-energized, manual start means for advancing the sequence relay from the third to the first position, means responsive to continued equalization of generator outputs for advancing the sequencing relay from its first to its second position, and means responsive to equalization or reversal of the difference between the signal generators for advancing from the second to the third position.

5. A processing system according to claim 4 in which additional positions of the sequencing relay are interposed between said second and third positions, means for progressively reducing the excitation of the first generator as the relay moves to successive ones of the additional positions, said processing means being adapted for partial processing when connected in each of the additional relay positions and said means responsive to equalization or reversal of the differences of generator output being adapted to advance the relay through the additional steps.

References Cited in the file of this patent

UNITED STATES PATENTS

| | | |
|---|---|---|
| 2,581,205 | Reilly | Jan. 1, 1952 |
| 2,668,493 | Moss et al. | Feb. 9, 1954 |
| 2,693,336 | Johnson et al. | Nov. 2, 1954 |